C. A. PARSONS, R. J. WALKER, S. S. COOK AND L. M. DOUGLAS.
TURBINE INSTALLATION FOR SHIP PROPULSION.
APPLICATION FILED MAY 15, 1916.

1,309,077.

Patented July 8, 1919.
6 SHEETS—SHEET 1.

Inventors:
Charles A. Parsons,
Robert J. Walker,
Stanley S. Cook,
Louis M. Douglas,
by Spear, Middleton, Donaldson & Spear
Attys.

C. A. PARSONS, R. J. WALKER, S. S. COOK AND L. M. DOUGLAS.
TURBINE INSTALLATION FOR SHIP PROPULSION.
APPLICATION FILED MAY 15, 1916.

1,309,077.

Patented July 8, 1919.
6 SHEETS—SHEET 2.

Inventors:
Charles A. Parsons,
Robert J. Walker,
Stanley S. Cook,
Louis M. Douglas,
by Spear, Middleton, Donaldson & Spear, Attys.

C. A. PARSONS, R. J. WALKER, S. S. COOK AND L. M. DOUGLAS.
TURBINE INSTALLATION FOR SHIP PROPULSION;
APPLICATION FILED MAY 15, 1916.

1,309,077.

Patented July 8, 1919.
6 SHEETS—SHEET 4.

Inventors: Charles A. Parsons,
Robert J. Walker,
Stanley S. Cook,
Louis M. Douglas.
by Spear Middleton Donaldson & Spear Attys.

C. A. PARSONS, R. J. WALKER, S. S. COOK AND L. M. DOUGLAS.
TURBINE INSTALLATION FOR SHIP PROPULSION.
APPLICATION FILED MAY 15, 1916.

1,309,077.

Patented July 8, 1919.
6 SHEETS—SHEET 3.

Inventors:
Charles A. Parsons,
Robert J. Walker,
Stanley S. Cook,
Louis M. Douglas, C. A. PARSONS, R. J. WALKER, S. S. COOK AND L. M. DOUGLAS.
TURBINE INSTALLATION FOR SHIP PROPULSION.
APPLICATION FILED MAY 15, 1916.

1,309,077.

Patented July 8, 1919.
6 SHEETS—SHEET 5.

Fig. 9.

*Inventors:*
*Charles A. Parsons,*
*Robert J. Walker,*
*Stanley S. Cook,*
*Louis M. Douglas,*
by *Spear Middleton, Donaldson & Spear* Atty's.

C. A. PARSONS, R. J. WALKER, S. S. COOK AND L. M. DOUGLAS.
TURBINE INSTALLATION FOR SHIP PROPULSION.
APPLICATION FILED MAY 15, 1916.

1,309,077.
Patented July 8, 1919.
6 SHEETS—SHEET 6.

INVENTOR
Charles A. Parsons
Robert J. Walker
BY Stanley S. Cook
Louis M. Douglas
Spear Middleton Donaldson Spear ATTORNEYS.

UNITED STATES PATENT OFFICE.

CHARLES ALGERNON PARSONS, OF NEWCASTLE-UPON-TYNE, AND ROBERT JOHN WALKER, STANLEY SMITH COOK, AND LOUIS MORTIMER DOUGLAS, OF WALLSEND, ENGLAND; SAID WALKER, SAID COOK, AND SAID DOUGLAS ASSIGNORS TO SAID PARSONS.

TURBINE INSTALLATION FOR SHIP PROPULSION.

1,309,077.        Specification of Letters Patent.        Patented July 8, 1919.

Application filed May 15, 1916. Serial No. 97,717.

*To all whom it may concern:*

Be it known that we, the honorable Sir CHARLES ALGERNON PARSONS, K. C. B., a subject of the King of Great Britain and Ireland, and residing at Heaton Works, Newcastle-upon-Tyne, in the county of Northumberland, England, and ROBERT JOHN WALKER, STANLEY SMITH COOK, and LOUIS MORTIMER DOUGLAS, all subjects of the King of Great Britain and Ireland, and all residing at Turbinia Works, Wallsend, in the county of Northumberland, England, have invented certain new and useful Improvements in and Relating to Turbine Installations for Ship Propulsion, of which the following is a specification.

The present invention relates to geared turbine installations for ship propulsion having two or more propeller shafts of the type in which each shaft is provided with a group of two or more distinct turbine units.

The object of the present invention is to provide an installation of this nature which shall avoid the occurrence of idle propellers at reduced powers and which shall permit the output of any particular turbine to be varied above and below the normal in order to maintain the desired relation between the turbines of the several propeller shafts as to their pressure drops and outputs.

In the specification of Letters Patent No. 972926 filed 25/4/1910, an arrangement is disclosed in which idle propellers at reduced powers are avoided by employing two or more propeller shafts on each of which is directly mounted a turbine unit divided into groups of stages and in which for lower powers one or more groups of stages on each shaft are completely isolated by which means all the shafts are driven while the total area available for steam flow is reduced correspondingly with the amount of steam passing.

The present invention consists in a geared turbine installation for ship propulsion having two or more propeller shafts each provided with a group of two or more distinct turbine units connected in series or in series-parallel for high powers in which at low powers one or more units of some or all of the shafts can be rendered inoperative, all remaining operative turbines on the several shafts being cross connected in series or in series-parallel, there being at least one turbine on each shaft in operation at all powers.

The present invention further consists in providing on the turbines which are operative at low powers in installations of this type stages which can be by-passed in such manner that at all powers the pressure drops across and the outputs of the various turbines in series can be maintained in substantially the proper relation.

The invention further consists in means for by-passing the final stage or stages of the operative high pressure turbine or turbines whereby the pressure drops across and the outputs of the various turbines in series can be maintained in substantially proper relation.

The invention further consists in means for by-passing the initial stages of the operative low pressure turbine or turbines whereby the pressure drops across and the outputs of the various turbines in series can be maintained in substantially the proper relation.

In co-pending application for Letters Patent Serial No. 51495 filed 18/9/1915, ship propulsion installations are disclosed in which the ratio of the revolutions of a main turbine to the revolutions of the propeller it drives differs at low powers from the ratio at full power.

The present invention further consists in providing those turbine units which remain in operation at low powers with a second set of transmission gearing which is put in operation at low powers and has a revolution ratio greater than the ratio of the full power gearing of the same units.

The invention further consists in the ship propulsion installations hereinafter described.

Referring to the accompanying drawings:—

Figure 1:
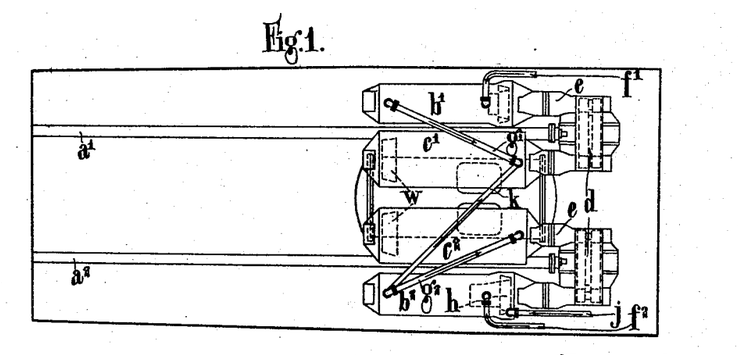
Figure 1 is a diagrammatic plan of the engine room of a ship containing an installation embodying the present invention as applied to a two-shaft arrangement.

In carrying the present invention into effect according to one example, as applied to a two-shaft installation, see Fig. 1, each shaft $a^1$, $a^2$ is driven at full power by a group or set of independent high and low pressure turbines $b^1$, $c^1$ and $b^2$, $c^2$, connected in series and operating through gearing $d$, the high pressure and low pressure rotors being suitably connected to their pinions.

For low power conditions the turbines which are operative at low power, namely, one high pressure unit $b^2$ of one set and one low pressure unit $c^1$ of the other set, remain connected to their pinions while the remaining units $c^2$ and $b^1$ are disconnected from their shafts by means of their clutches $e$.

Steam is admitted by the conduit $f^2$ to the high pressure turbine $b^2$ which is coupled to the propeller shaft $a^2$ and passes by the conduit $k$ to the low pressure turbine $c^1$ coupled to the propeller shaft $a^1$. The steam conduits $f^1$, $g^1$, $g^2$ of the remaining turbine units being closed they remain under these conditions idle and disconnected.

In some cases a cruising stage $h$ is provided in the high pressure turbine unit $b^2$ which is operative at low powers, in which case the steam is admitted under low power conditions in front of the cruising stage by the conduit $j$.

In a modification of the above described form a separate cruising turbine is provided operating one of the propeller shafts or any suitable pinion shaft through single or double reduction gearing.

A suitable clutch is provided for disconnecting the cruising turbine under full power conditions.

Figure 2:
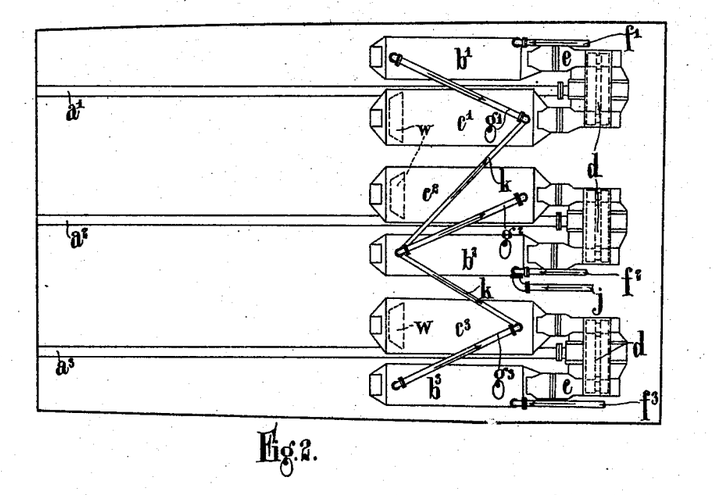
Fig. 2 is a diagrammatic plan illustrating a three-shaft arrangement.

According to a second modification, as applied to a three-shaft installation, see Fig. 2, a high and a low pressure turbine arranged to operate in series at full power are provided at each shaft, each of the units being connected to its propeller shaft through gearing $d$.

Under high power conditions all the turbines are clutched to their propeller shafts and steam is admitted by the conduits $f^1$, $f^2$, $f^3$, to each of the high pressure units $b^1$, $b^2$, $b^3$, through which it passes to its low pressure unit and thence to the condenser.

Under low power conditions the high pressure units $b^1$ and $b^3$ on each of the wing shafts are disconnected by means of their clutches $e$, and the low pressure unit $c^2$ upon the center shaft is disconnected by means of its clutch $e$.

Steam is admitted by the conduit $f^2$ to the high pressure turbine $b^2$ upon the center shaft, the exhaust from which is divided and passes by the conduits $k$ to the low pressure turbines $c^1$ and $c^3$ upon the wing shafts.

Under these conditions the high pressure units $b^1$, $b^3$, on the wing shafts and the low pressure unit $c^2$ on the center shaft are idle and disconnected.

As in the first described form a cruising stage may in some cases be provided in the high pressure unit $b^2$ upon the center shaft, in which case at low power steam may be supplied by the conduit $j$ in front of the cruising stage.

In some cases such an installation may be arranged so that the exhaust from one of the wing high pressure turbines is divided at low power between the low pressure turbines on the center shaft and the remaining wing shaft.

According to a third modification, a cruising turbine is provided connected at low powers to one of the propeller shafts or any pinion shaft through single or double reduction gearing.

Figure 3:
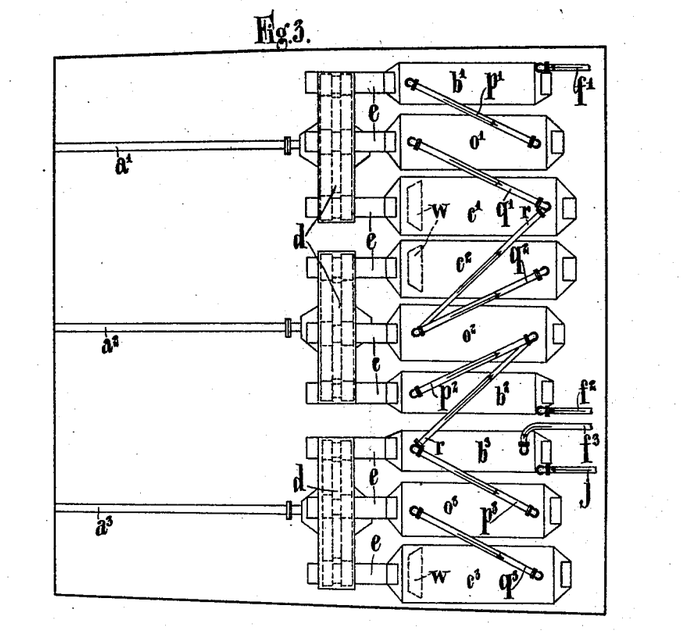
Fig. 3 is a diagrammatic plan illustrating a three-shaft arrangement in which each of the shafts is driven by a group comprising high, intermediate and low pressure turbines.

According to a fourth modification, see Fig. 3, as applied to a three-shaft installation, each of the shafts is provided with a group or set of three independent turbines, high pressure, intermediate pressure and low pressure. The pinions of all three turbines of each group may engage a common gear wheel upon their propeller shaft. Under full power conditions steam is admitted to all the high pressure turbines by the conduits $f^1$, $f^2$, $f^3$. The exhausts from the high pressure turbines pass to the intermediate pressure turbines $o^1$, $o^2$, $o^3$, by the conduits $p^1$, $p^2$, $p^3$. From the intermediate pressure turbines the steam passes to the low pressure turbines $c^1$, $c^2$, $c^3$, by the conduits $q^1$, $q^2$, $q^3$.

Under low power conditions, the turbines $b^1$, $o^1$, $c^2$, $b^2$, $o^3$ and $c^3$ are disconnected from their propeller shafts by means of clutches $e$, and steam is admitted by the conduit $f^3$ to the high pressure turbine $b^3$ upon the shaft $a^3$. From thence the steam passes by the conduits $r$ to the intermediate pressure turbine $o^2$ on the center shaft $a^2$, and from there to the low pressure turbine $c^1$ upon the shaft $a^1$.

Astern turbines $w$ may be incorporated in any or all of the low pressure turbines.

Figure 4:
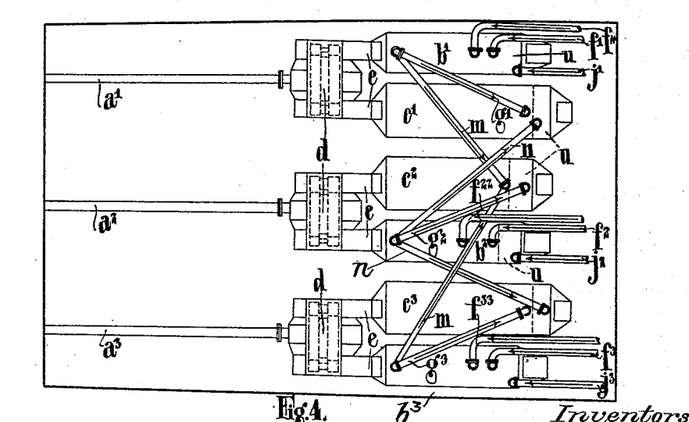
Fig. 4 is a diagrammatic plan of an arrangement in which each of three shafts is driven by a group comprising high and low pressure turbines, each turbine having an additional initial stage, the by-pass and pipe arrangements being such that several power combinations can be employed.

According to a fifth modification, see Fig. 4, and as applied to a three-shaft installation so arranged that several power outputs may be obtained, each of the shafts is provided with independent high and low pressure turbines $b^1$, $c^1$, $b^2$, $c^2$, $b^3$, $c^3$. All the turbines may be provided with additional initial stages $u$.

Under normal full power conditions, steam is admitted to all the high pressure turbines by the inlets $f^1$, $f^2$, $f^3$ which by-pass the additional initial stages. The steam passes from each high pressure turbine to its associated low pressure turbine by suitable conduits $g^1$, $g^2$, $g^3$, by-passing the additional stages of the wing low pressure turbines, but flowing through the additional stages of the center low pressure turbine.

For a power output slightly less than the normal full power output, steam is admitted to the high pressure turbines by the inlets $j^1$, $j^2$, $j^3$ which feed the additional initial stages.

For an output slightly greater than the normal full power output, steam is admitted to the high pressure turbines by inlets $f^{11}$, $f^{22}$, $f^{33}$, so placed as to by-pass certain of the normal full power stages.

At low power when working, for example, at about two-thirds normal full power, steam is admitted under normal conditions to each of the wing high pressure turbines by the inlets $f^1$, $f^3$, which by-pass the additional initial stages and the exhaust from the wing high pressure turbines passes by suitable conduits $m$, $m$, to the center low pressure turbine.

The large quantity of steam thus passing through the single low pressure turbine on the center shaft would in ordinary circumstances give rise to a high initial pressure at the low pressure inlet, and a great discrepancy in the pressure drops and outputs of the turbines of the center and wing shafts would result. This is obviated by by-passing the additional initial stages of the center low pressure turbine.

For a power output slightly less than the normal two-thirds, steam is admitted to the wing high pressure turbines by the inlets $j^1$, $j^3$, which feed the additional initial stages.

For an output slightly greater than the normal two-thirds, steam is admitted to the wing high pressure turbines by inlets $f^{11}$, $f^{33}$, so placed as to by-pass certain of the normal full power stages.

When working at about one-third normal full power, steam is admitted for a normal one-third output to the center high pressure turbine by the inlet $f^2$ which by-passes the additional initial stages, and after passing through this turbine it divides and passes to the additional initial stages of the wing low pressure turbines by suitable conduts $n$, $n$. In ordinary circumstances the large area of the wing low pressure turbines for the small amount of steam passing to them from the center high pressure turbine would result in a great discrepancy in the pressure drops and outputs of the turbines of the center and wing shafts. This difficulty, however, is overcome by introducing the additional initial stage of the wing low pressure turbines.

For a power output slightly less than the normal one-third output, steam is admitted to the center high pressure turbine by the inlet $j^2$ which feeds the additional initial stages. After passing through the initial and normal full power stages it divides as before and passes to the inlets of the additional initial stages of the wing low pressure turbines.

For an output slightly greater than the normal one-third output, steam is admitted to the center high pressure turbine by an inlet $f^{22}$ so placed as to by-pass certain of the initial normal full power stages. The exhaust divides as in the previous case and passes to the inlets of the additional initial stages of the wing low pressure turbines.

As an alternative to, and in some cases in addition to the bringing into use of additional initial stages in the wing low pressure turbines, the difficulty may be met by exhausting from the center high pressure turbine at an earlier stage.

Figure 9:
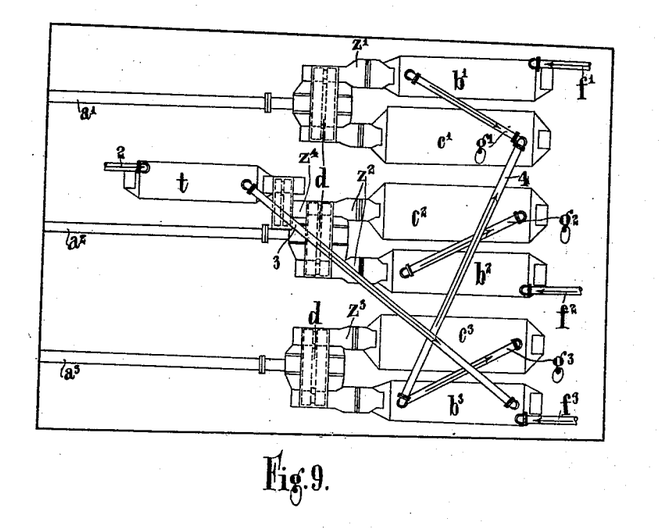
Fig. 9 illustrates diagrammatically a three-shaft installation embodying a modification of the present invention.

According to a sixth modification, see Fig. 9, and as applied to a three-shaft installation, there are provided on each of the shafts high pressure turbine units $b^1$, $b^2$, $b^3$, and low pressure turbine units $c^1$, $c^2$, $c^3$, the high and low pressure turbines on each shaft being adapted to operate in series at full power.

The center shaft $a^2$ is further provided with a cruising turbine $t$ which may drive the shaft $a^2$ through single or double reduction gear.

At full power the high pressure turbines $b^1$, $b^2$, $b^3$, are fed by the conduits $f^1$, $f^2$, $f^3$, and the cruising turbine $t$ is disconnected by a suitable clutch $z^4$.

At intermediate powers, the turbine $t$ is disconnected from the shaft $a^2$, and the turbines $b^1$ and $c^3$ are disconnected from the shafts $a^1$ and $a^3$ respectively by their clutches $z^1$ and $z^3$. Steam is admitted by the conduit $f^2$ to the high pressure turbine $b^2$, which operates in series with its own low pressure turbine $c^2$ as at full power. Steam is also supplied by the conduit $f^3$ to the high pressure turbine $b^3$, the exhaust from which is carried to the low pressure turbine $c^1$ upon the other wing shaft.

At low power the turbine units $b^2$, $c^2$, are disconnected from $a^2$ by the clutches $z^2$, and the turbine $t$ is fed by the conduit 2, and its exhaust is taken by the pipe 3 to $b^3$, and from $b^3$ to $c^1$ by the pipe 4, the turbine units $b^1$ and $c^3$ being disconnected by their clutches $z^1$, $z^3$.

It will be seen that when the cruising turbine is in operation the flow of steam is similar to that described in co-pending application Serial No. 51496, filed 18/9/1915.

Figure 5:
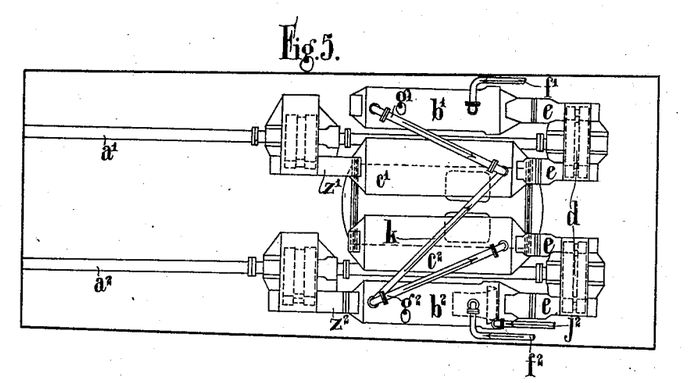
Fig. 5 illustrates diagrammatically an installation similar to that shown in Fig. 1 having change speed gearing.

According to a seventh modification and as carrying out the second part of the present invention as applied to the first described form, see Fig. 5, there is provided in addition to the gearing $d$ described a second set of gearing $s$ upon each of the propeller shafts $a^1$, $a^2$.

This second set of gearing $s$ upon the shaft $a^2$ connects the high pressure unit $b^2$ operative at low powers with that shaft through a greater reduction ratio, while the second set of gearing $s$ upon the shaft $a^1$ connects the low pressure unit $c^1$ operative at low powers with its shaft through a greater reduction ratio.

Under low power conditions the high pressure unit $b^1$ upon the shaft $a^1$ is disconnected and the low pressure unit $c^2$ upon the shaft $a^2$ is disconnected. The low pressure unit $c^1$ upon the first mentioned shaft is disconnected from its full power set of gearing $d$ and connected by the clutch $z^1$ to its low power set of gearing $s$ upon that shaft, while the high pressure unit $b^2$ upon the other shaft, is disconnected from its full power gearing $d$ by its clutch $e$, and connected by the clutch $z^2$ to its low power gearing $s$.

Steam is admitted to the last mentioned high pressure unit $b^2$ and the exhaust passes to the low pressure unit $c^1$ upon the other shaft.

As in the first described form, the high pressure turbine $b^2$ operative at low powers may be fitted with one or more cruising stages $u$, fed by the steam conduit $f^2$ whereby a high initial steam pressure is maintained.

Figure 6:
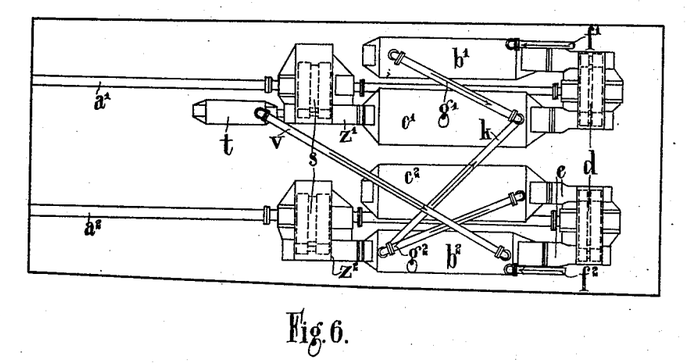
Fig. 6 illustrates diagrammatically an engine room similar to Fig. 5 with the addition of a cruising turbine.

According to a ninth modification, see Fig. 6, the two-shaft installation described in the seventh modification is provided with a special cruising turbine $t$ or turbines through which at low powers the live steam is passed before exhausting through the conduit $v$ to the main turbine $b^2$. The cruising turbine $t$ may operate through single reduction gearing as shown or through double reduction gearing, either on the propeller shafts or any pinion shaft.

Figure 7:
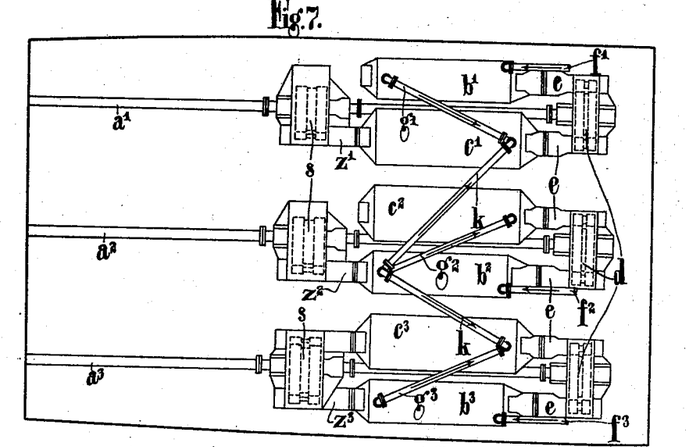
Fig. 7 illustrates an engine room similar to that shown in Fig. 2 but having change speed gearing.

According to a tenth modification, see Fig. 7, a three-shaft installation is employed similar to that described with reference to the second modification, Fig. 2, but in addition to the gearing $d$ provided in the second modification another set of gearing $s$ is provided upon each of the shafts so arranged that at low powers the high pressure turbine unit $b^2$ upon the center shaft $a^2$ can be coupled to the center shaft through gearing of a greater ratio while the low pressure turbines $c^1$ and $c^3$ on the wing shafts $a^1$ and $a^3$ can be connected to those shafts also through gearing of a greater ratio.

At full power, the rotors are all geared to their propeller shafts by the gearings $d$, and steam is admitted to each high pressure turbine by conduits $f^1$, $f^2$, $f^3$, and passes to the condenser through the low pressure turbine of its shaft.

At low powers, the steam enters the high pressure turbine $b^2$ upon the center shaft $a^2$ and passes thence into the low pressure turbine $c^1$ and $c^3$ of the wing shafts.

Under these conditions all the turbines are disconnected from their gearings $d^3$ through suitable clutches $s$, and the operative turbines $b^2$, $c^1$, and $c^3$ are connected by clutches $z^1$, $z^2$, and $z^3$ of the sets of gearing $s$.

Figure 8:
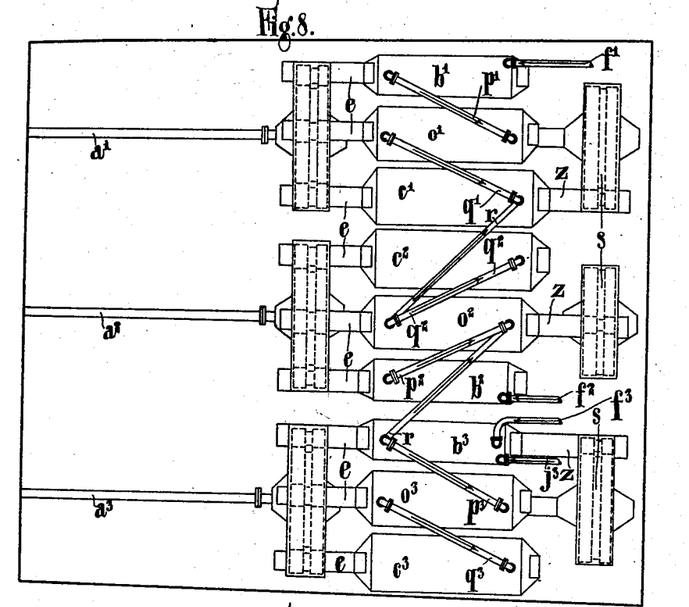
Fig. 8 illustrates diagrammatically an engine room similar to that shown in Fig. 3 but having change speed gearing.

Fig. 8 shows the application of change speed gearing to an installation such as is described with reference to Fig. 3. In this installation there is provided a second set of gearing $s$, having a greater reduction ratio than the sets of gearing $d$. These second sets of gearing $s$ are arranged so that the high pressure turbine $b^3$, the intermediate pressure turbine $c^2$, and the low pressure turbine $c^1$, can drive the propeller shafts $a^2$, $a^3$, and $a^1$, respectively at reduced powers. As before, suitable clutches $e$ and $z$ are provided for connecting and disconnecting the desired turbines.

The turbines and additional stages may be of the reaction or impulse types or combinations of these types.

In cases where second sets of gearing $s$ are provided, clutches may also be provided by which means the gearing not in operation may be disconnected from the propeller shaft.

It will be seen that the arrangements described provide particularly satisfactory distributions of pressure drop across the turbines for any power conditions.

Figure 10:
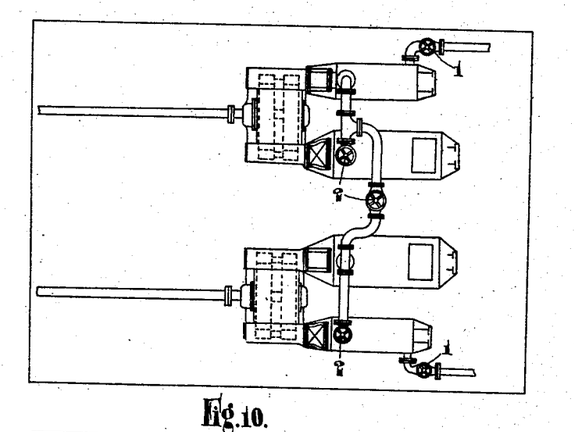
Figs. 10 and 11 illustrate diagrammatically the steam pipe connections and valves.
Figure 11:
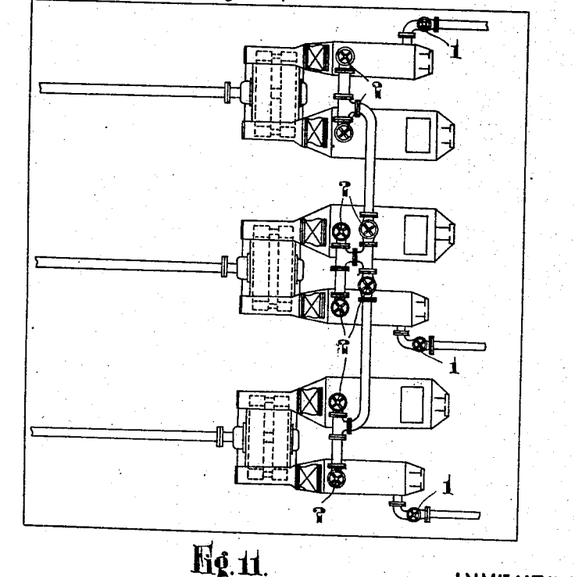

The steam pipes are arranged in the two and three shaft installations respectively as shown in Figs. 10 and 11. In these figures the main steam inlet valves to the high pressure turbines are indicated by the numeral 1 and the valves to provide the necessary cross connections between the turbines by the numeral 2.

Having now described our invention, what we claim as new and desire to secure by Letters Patent is:—

1. A turbine installation for ship propulsion, comprising in combination a plurality of propeller shafts, a set of turbine units for each shaft, each set including a high pressure turbine and a lower pressure turbine in independent casings, gearing between the turbines of each set and the shaft to be driven thereby, pressure fluid conducting means for connecting each high pressure turbine with its lower pressure turbine and pressure fluid conducting means for cross connecting a high pressure turbine with the lower pressure turbine of another set, at least one turbine unit of each set being inoperative when the cross connection is working, and clutches for rendering said units idle or active.

2. A turbine installation for ship propulsion, comprising in combination a plurality of propeller shafts, a set of turbine units for each shaft, each set including a high pressure turbine and a lower pressure turbine in independent casings, gearing between the turbines of each set and the shaft to be driven thereby, means connecting each high pressure turbine with its lower pressure turbine and means for cross connecting a high pressure turbine with the lower pressure turbine of another set, at least one turbine unit of each set being inoperative when the cross connection is working, including the high pressure turbine of the set whose lower pressure turbine is cross connected with a high pressure turbine of the other set, and the lower pressure turbine of the set whose high pressure turbine remains active, and clutches for rendering said turbines idle or active.

3. A geared turbine installation for ship propulsion having three propeller shafts each provided with a high pressure and a low pressure turbine connected in series for full power, in which at intermediate powers the high pressure turbines on two shafts exhaust to the low pressure turbine on the remaining shaft, the remaining turbines being rendered inoperative, and in which at low powers the high pressure turbine on one shaft exhausts to the low pressure turbines on the other shafts, the remaining turbines being rendered inoperative, by which three graduations of power are obtainable.

4. A geared turbine installation as claimed in claim 3, characterized by the provision on each of the three high pressure turbines of three separate steam inlets admitting steam at different stages along the turbine axis by which nine graduations of power are obtainable.

In testimony whereof we have affixed our signatures.

CHARLES ALGERNON PARSONS.
ROBERT JOHN WALKER.
STANLEY SMITH COOK.
LOUIS MORTIMER DOUGLAS.

Copies of this patent may be obtained for five cents each, by addressing the "Commissioner of Patents, Washington, D. C."